Figure 1:
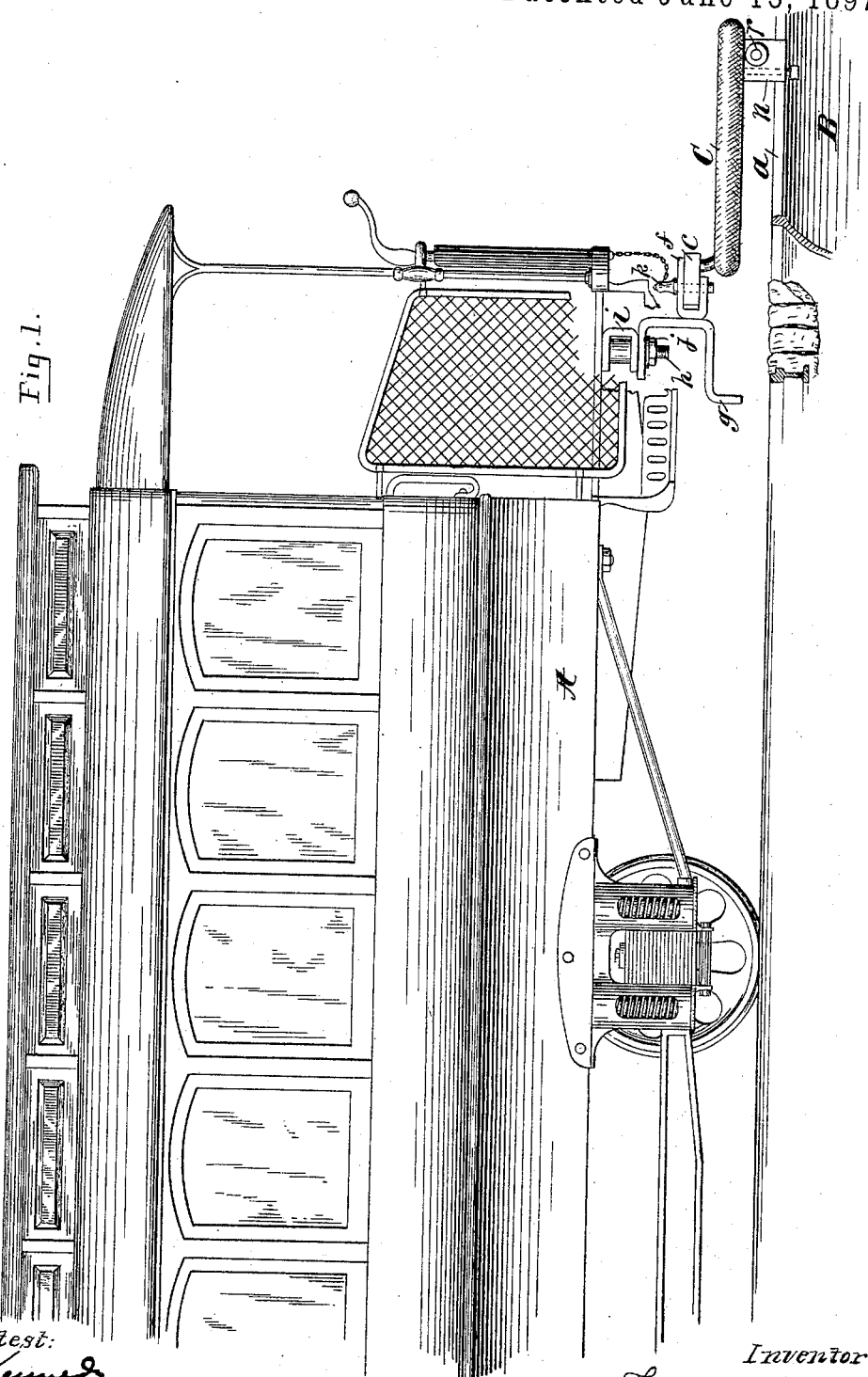

(No Model.)

T. W. FITZGERALD.
CAR FENDER.

No. 584,469.

Patented June 15, 1897.

2 Sheets—Sheet 1.

Attest:
J J Kennedy
Joseph White

Inventor
Thomas W Fitzgerald
by Philipp Munson Phelps
Attys

THE NORRIS PETERS CO., PHOTO-LITHO., WASHINGTON, D. C.

(No Model.)  2 Sheets—Sheet 2.

T. W. FITZGERALD.
CAR FENDER.

No. 584,469. Patented June 15, 1897.

Attest:
J. J. Kennedy
Joseph White

Inventor
Thomas W. Fitzgerald
by
Philipp Munun Phelps
Attys

UNITED STATES PATENT OFFICE.

THOMAS W. FITZGERALD, OF NEW YORK, N. Y.

CAR-FENDER.

SPECIFICATION forming part of Letters Patent No. 584,469, dated June 15, 1897.

Application filed May 25, 1894. Serial No. 512,398. (No model.)

*To all whom it may concern:*

Be it known that I, THOMAS W. FITZGERALD, a citizen of the United States, residing at New York, county of New York, and State of New York, have invented certain new and useful Improvements in Car-Fenders, fully described and represented in the following specification and the accompanying drawings, forming a part of the same.

This invention relates to improvements in car-fenders, the improvements of the present invention having for their object, mainly, the provision of a fender for use on the cars of cable or electric railways employing conduits containing the cable or electric conductor and provided with a longitudinal slot through which the car is connected with the cable or conductor in the conduit.

In order that a fender may be effective for all purposes for which it is intended, it is necessary, among other things, that the forward edge of the fender should approach so closely to the surface of the road-bed as to engage and scoop up small as well as large bodies which may be lying upon the road or if it does not scoop them up push them along in front of it until the car is stopped. A body lying on the track and engaged by the forward edge of the fender, however, naturally has a tendency to resist the movement of the fender and to force it upwardly and to then get under it, with the result that instead of being scooped up or shoved along in front of the fender the body will be wedged under the fender and be rolled beneath it, or, if the fender be moved sufficiently to let the body pass entirely under it, be rolled between the bottom of the car and the surface of the road or crushed by the wheels. This is a difficulty existing in fenders heretofore devised, no matter how strong and rigid their construction may be nor how strongly or rigidly they may be connected to the car-body, and this difficulty it is the object of the present invention to overcome and in the case of electric or cable railways using conduits to utilize the conduit-slot for this purpose.

To this end the invention, briefly stated, consists in a fender connected at its rear end to the car-body and provided with means, preferably at or near its forward edge, traveling in the conduit-slot and engaging the interior of the conduit so as to lock the fender thereto against upward movement and thus prevent a body or other object engaged by the fender and not scooped up by it from wedging under the fender or the car-body or passing thereunder to the wheels.

As a full understanding of the present invention can best be given by a detailed description of an organization embodying the same, such description will now be given in connection with the accompanying drawings, in which—

Figure 2:
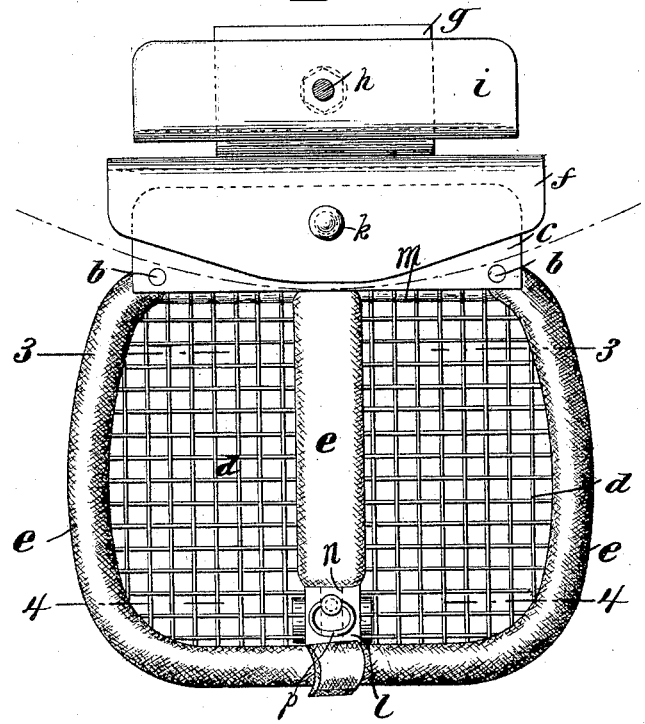
Figure 3:
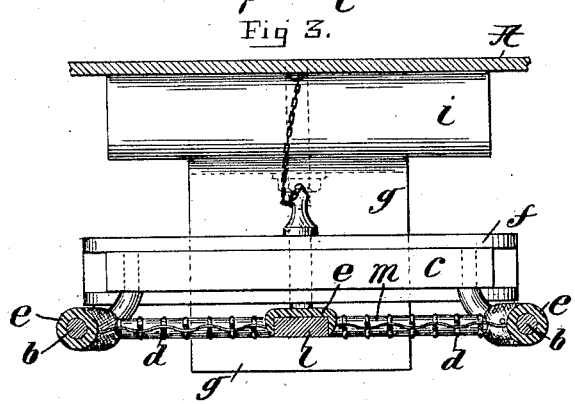
Figure 4:
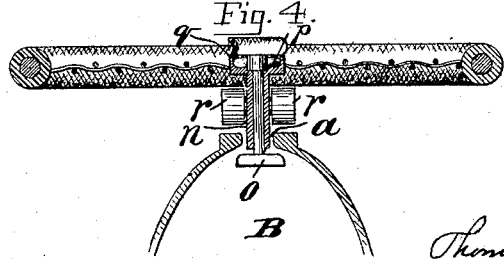

Figure 1 is a side elevation of a car, a portion of the road-bed upon which it is propelled, including an underground conduit containing a cable or electric conductor for propelling the car, and showing also the fender and the connections between it and the conduit. Fig. 2 is a plan view, on an enlarged scale, illustrating particularly the car-fender, a portion of the car-body, and the connections between the fender and the car. Fig. 3 is a section on the line 3 3 of Fig. 2, illustrating particularly the connections between the fender and the car-body. Fig. 4 is a section on the line 4 4 of Fig. 2, illustrating particularly the connections between the fender and conduit.

Referring to said drawings, A represents the car, and B the conduit containing the cable or electric conductor for propelling the car, the conduit being provided with the usual longitudinal slot $a$, through which connection is made between the car and cable or conductor.

C represents the fender, which is made up of a frame of wire $b$, bent to approximately U shape, the ends of which are turned up and secured in a plate $c$, by which, as will presently appear, the fender is connected to the car for use. The space within the U-shaped frame formed by wire $b$ will, as usual, preferably be filled with netting $d$, and the wire will also preferably be covered with rubber hose or similar soft material $e$ for softening the blow of the fender in striking a body. The plate $c$ is provided with a central opening and is adapted when in position upon the car to fit in a similarly-shaped yoke $f$, secured to a bracket $g$, which is in turn pivotally connected to the car-body by means of a king-bolt $h$, passing through the car-platform, a bolster $i$, secured to the under side thereof, and bracket $g$, the lower end of the bolt $h$ being provided with a nut $j$ for retaining the bracket in place against the bolster $i$. The yoke $f$ is provided with openings registering with that in plate $c$ for receiving a coupling-pin $k$, chained to the car, which, passing through the yoke $f$ and plate $c$, connects the fender to the body of the car.

The fender is provided at its center and extending longitudinally thereof above slot $a$ with a plate $l$, connected at its forward end to wire $b$ and at its rear to a wire $m$, connected to the two ends of wire $b$ at the rear of the fender. Like the wire $b$ the plate $l$ is provided with a covering of rubber hose or other similar soft material $e$. The plate $l$ is further provided at or near its forward end with a guiding-block $n$, extending downwardly from the fender into the slot $a$ of the conduit for guiding the fender around curves or switches and retaining it always in position centrally of the track. It is also provided with an inverted T-arm $o$, passing through the block $n$ and the forked end of which extends down into the conduit below its slot. The upper end of the T-arm is provided with a handle or ring $p$, by which it may be turned, so that its forked portion may be brought lengthwise of the slot for removal from the conduit or crosswise thereof, so as to engage the walls of the conduit and lock the fender against vertical movement. A suitable depression or slot $q$ will preferably be formed in the upper face of the plate $l$, in which the ring $p$ rests flush with the surface of the plate to prevent rotation of the T-arm $o$ after movement to locking position in the conduit and to prevent the ring striking a body thrown upon the fender as it might do if allowed to project. That portion of the covering $e$ on plate $l$ which is to cover that portion of the plate containing it is in the form of a flap $s$, hinged to the covering $e$ over wire $b$, so that it may be raised from the plate when the T-arm is to be adjusted.

The operation of the construction described is as follows: With the fender connected as described to the car-body it is capable of swinging horizontally on the car-body, and with the guiding-block $n$ located in the slot the fender, as the car moves, will be guided around curves and switches, and thus kept always in the front of the wheels of the car. With the T-arm extending across the slot inside the conduit also the fender is connected to the conduit and thus held from movement upwardly by a body or other obstruction met with and engaged by the forward end of the fender. The forked end of the T-arm will normally rest in the conduit when in use slightly out of contact with the walls thereof, so as to avoid friction, and will only engage such walls when a body or other obstruction is engaged by the fender which exerts upward pressure upon the fender. The front edge of the fender will normally be supported within about two or three inches of the surface of the road-bed, so as to engage smaller bodies or other obstacles, but at the same time clear small stones or unevenness met with in the road-bed. Should a body met with be standing, the front edge of the fender, striking at about the ankles, will overturn the body, which will then fall upon the fender and be sustained thereby until the car is stopped.

To avoid as far as possible friction between the fender and the road-bed and at the same time furnish a support for the fender under the weight of the body resting on it, the fender is provided with a pair of friction-rollers $r$, journaled on studs projecting from the sides of the guiding-block $n$ in line with the upper edges of the conduit on opposite sides of the slot. Normally these rollers are out of contact with the upper edges of the conduit and surface of the road, but under the weight of a body falling on the fender will rest upon and enable the fender to glide smoothly and without friction along the upper edges of the conduit.

Each end of the car will be provided with the fixture consisting of pivoted bracket and yoke, and but one fender need be provided for each car, so that as the car's direction of movement is to be reversed the fender may be uncoupled from one end and coupled to the other. To detach the fender from one end of the car, all that need be done is to turn the T-arm $o$ from a position crosswise of the conduit-slot to a position lengthwise thereof and then remove the coupling-pin $k$, when the fender may be lifted up and carried to the opposite end of the car. If, however, instead of mounting the T-arm $o$ so as to turn on the fender it should be rigidly connected thereto, the fender should be first uncoupled from the car and then turned about until the forked end of the T-arm is lengthwise of the slot.

The fender and the connections between it and the car-body and the conduit-slot are illustrated and have been described in what is considered their preferred form. Modifications may be made therein to suit the requirements of each case or as desired without departing from the present invention.

What is claimed is—

1. In a railway, the combination with a car, of a fender connected to the car and provided with means extending transversely to the road-bed and engaging a stationary part thereof to lock the fender in operative position against upward movement, substantially as described.

2. In a railway, the combination with a car, of a fender connected to the car and provided at or near its forward edge with means extending transversely to the road-bed and engaging a stationary part thereof to lock the fender to the road-bed in operative position against upward movement, substantially as described.

3. In a railway employing a longitudinally-slotted conduit, the combination with a car traveling above said conduit, of a fender connected to the car and provided with means extending into and engaging the interior of the conduit below the slot to lock the fender in operative position against upward movement, substantially as described.

4. In a railway employing a longitudinally-slotted conduit, the combination with a car traveling above said conduit, of a fender connected at its rear to the car and provided at or near its forward edge with means extending into and engaging the interior of the conduit below the slot to lock the fender in operative position against upward movement, substantially as described.

5. In a railway employing a longitudinally-slotted conduit, the combination with a car traveling above said conduit, of a fender connected to the car and provided with an arm extending into and engaging the interior of the conduit below the slot to lock the fender in operative position against upward movement, substantially as described.

6. In a railway employing a longitudinally-slotted conduit, the combination with a car traveling above said conduit, of a fender connected at its rear to the car and provided with means extending into and engaging the interior of the conduit below the slot to lock the fender in operative position against upward movement, substantially as described.

7. In a railway employing a longitudinally-slotted conduit, the combination with a car traveling above said conduit, of a fender pivotally connected to the car so as to swing horizontally thereon, and provided with means extending into and engaging the interior of the conduit below the slot to lock the fender in operative position against upward movement, substantially as described.

8. In a railway employing a longitudinally-slotted conduit, the combination with a car traveling above said conduit, of a fender pivotally connected at its rear to the car so as to swing horizontally thereon and provided at or near its forward edge with means extending into and engaging the interior of the conduit below the slot to lock the fender in operative position against upward movement, substantially as described.

9. In a railway employing a longitudinally-slotted conduit, the combination with a car traveling above said conduit, of a fender pivotally connected to the car so as to swing horizontally thereon, and provided with an arm extending into and engaging the interior of the conduit below the slot to lock the fender in operative position against upward movement, substantially as described.

10. In a railway employing a longitudinally-slotted conduit, the combination with a car traveling above said conduit, of a fender pivotally connected at its rear to the car so as to swing horizontally thereon, and provided with means extending into and engaging the interior of the conduit below the slot to lock the fender in operative position against upward movement, substantially as described.

11. In a railway employing a longitudinally-slotted conduit, the combination with a car traveling above said conduit, of a fender connected to the car and provided with an arm having a forked locking end extending into the conduit below the slot to lock the fender in operative position against upward movement, substantially as described.

12. In a railway employing a longitudinally-slotted conduit, the combination with a car traveling above said conduit, of a fender connected at its rear to the car and provided at or near its forward edge with an arm having a forked locking end extending into the conduit below the slot to lock the fender in operative position against upward movement, substantially as described.

13. In a railway employing a longitudinally-slotted conduit, the combination with a car traveling above said conduit, of a fender connected to the car and provided with an arm having a forked locking end extending into the conduit below the slot to lock the fender in operative position against upward movement, said arm being adjustable on the fender to locking and unlocking positions, substantially as described.

14. In a railway employing a longitudinally-slotted conduit, the combination with a car traveling above said conduit, of a fender connected at its rear to the car and provided at or near its forward edge with an arm having a forked locking end extending into the conduit below the slot to lock the fender in operative position against upward movement, said arm being adjustable on the fender to locking and unlocking positions, substantially as described.

15. In a railway employing a longitudinally-slotted conduit, the combination with a car traveling above said conduit, of a fender connected to the car and provided with an inverted T-arm extending into and engaging the interior of the conduit below the slot to lock the fender in operative position against upward movement, substantially as described.

16. In a railway employing a longitudinally-slotted conduit, the combination with a car traveling above said conduit, of a fender pivotally connected to the car so as to swing horizontally thereon, and provided with an arm having a forked locking end extending into the conduit below the slot to lock the fender in operative position against upward movement, substantially as described.

17. In a railway employing a longitudinally-slotted conduit, the combination with a car traveling above said conduit, of a fender pivotally connected to the car so as to swing horizontally thereon, and provided with an inverted T-arm extending into the conduit below the slot to lock the fender in operative position against upward movement, substantially as described.

18. In a railway employing a longitudinally-slotted conduit, the combination with a car traveling above said conduit, of a fender connected to the car and provided with an arm having a forked locking end extending into the conduit below the slot to lock the fender in operative position against upward movement, said arm being adapted to turn on the fender to locking and unlocking positions, substantially as described.

19. In a railway employing a longitudinally-slotted conduit, the combination with a car traveling above said conduit, of a fender connected at its rear to the car and provided at or near its forward edge with an arm having a forked locking end extending into the conduit below the slot to lock the fender in operative position against upward movement, said arm being adapted to turn on the fender to locking and unlocking positions, substantially as described.

20. In a railway employing a longitudinally-slotted conduit, the combination with a car traveling above said conduit, of a fender pivotally connected to the car so as to swing horizontally thereon and provided at or near its forward edge with means extending into the slot for guiding the movement of the fender horizontally and with means extending into and engaging the interior of the conduit below the slot to lock the fender in operative position against upward movement, substantially as described.

21. In a railway employing a longitudinally-slotted conduit, the combination with a car traveling above said conduit, of a fender pivotally connected to the car so as to swing horizontally thereon, a guiding-block extending into the conduit-slot and an arm provided with a forked end extending into the conduit, said guiding-block and arm being both connected to the fender at or near its forward edge, substantially as described.

22. In a railway employing a longitudinally-slotted conduit, the combination with a car traveling above said conduit, of a fender connected to the car, and an inverted T-arm entering the conduit and connected to the forward end of the fender so as to turn therein, substantially as described.

23. In a railway employing a longitudinally-slotted conduit, the combination with a car traveling above said conduit, of a fender pivotally connected to the car, and an inverted T-arm entering the conduit and connected to the forward end of the fender so as to turn therein, substantially as described.

24. In a railway employing a longitudinally-slotted conduit, the combination with a car traveling above said conduit, of a fender pivotally connected to the car, a guiding-block $n$ connected to the under side of the fender and entering said slot, and an arm $o$ passing through and adapted to turn in the guiding-block and provided with a forked end entering the conduit, substantially as described.

25. In a railway employing a longitudinally-slotted conduit, the combination with a car traveling above said conduit, of a fender pivotally connected to the car, a guiding-block $n$ connected to the forward end of the fender and entering said slot, and rollers $r$ carried by the fender on opposite sides of the guiding-block between the road-bed and the under side of the fender but normally out of contact with the road-bed, substantially as described.

26. In a railway employing a longitudinally-slotted conduit, the combination with a car traveling above said conduit, of a fender pivotally connected to the car, a guiding-block $n$ connected to the forward end of the fender and entering said slot, and an arm $o$ connected to the fender and provided with a forked end entering the conduit, substantially as described.

27. In a railway employing a longitudinally-slotted conduit, the combination with a car traveling above said conduit, of a fender provided with means for engaging the conduit to lock the fender in operative position against upward movement, a bracket, as $g$, pivotally connected to the car, a yoke, as $f$, connected to the bracket, a plate, as $c$, connected to the fender, and a coupling-pin, as $k$, for coupling the plate and yoke, substantially as described.

28. The combination with conduit B and its slot, of fender C provided with plate $l$, T-arm $o$ mounted to turn in the forward end of said plate, a handle, as $p$, connected to the arm $o$ for turning the same, a cover $e$ secured to the edges of the fender and to the plate $l$, and a hinged flap $s$ for covering that part of the plate $l$ containing the handle $p$, substantially as described.

In testimony whereof I have hereunto set my hand in the presence of two subscribing witnesses.

THOMAS W. FITZGERALD.

Witnesses:
T. F. KEHOE,
J. J. KENNEDY.